(12) United States Patent
Kuemerle et al.

(10) Patent No.: US 9,372,520 B2
(45) Date of Patent: Jun. 21, 2016

(54) REVERSE PERFORMANCE BINNING

(71) Applicant: GLOBALFOUNDRIES INC., Grand Cayman (KY)

(72) Inventors: Mark W. Kuemerle, Essex Junction, VT (US); Paul S. Zuchowski, Jerico, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 363 days.

(21) Appl. No.: 13/963,438

(22) Filed: Aug. 9, 2013

(65) Prior Publication Data

US 2015/0046739 A1 Feb. 12, 2015

(51) Int. Cl.
*G06F 17/50* (2006.01)
*G06F 1/26* (2006.01)

(52) U.S. Cl.
CPC ........................................ *G06F 1/26* (2013.01)

(58) Field of Classification Search
USPC ........................................................ 716/136
See application file for complete search history.

(56) References Cited

U.S. PATENT DOCUMENTS

| | | | |
|---|---|---|---|
| 6,133,582 A | 10/2000 | Osann et al. | |
| 6,289,465 B1 | 9/2001 | Kuemerle | |
| 6,457,131 B2 | 9/2002 | Kuemerle | |
| 6,792,582 B1 | 9/2004 | Cohn et al. | |
| 7,475,366 B2 | 1/2009 | Kuemerle et al. | |
| 7,533,283 B2 | 5/2009 | Fung | |
| 7,793,237 B2 | 9/2010 | Bonaccio et al. | |
| 7,810,054 B2 | 10/2010 | Anemikos et al. | |
| 7,877,714 B2 | 1/2011 | Anemikos et al. | |
| 7,917,451 B2 * | 3/2011 | Barnett | G06F 17/5036 705/400 |
| 8,141,012 B2 | 3/2012 | Buck et al. | |
| 2006/0202713 A1 * | 9/2006 | Shumarayev | G06F 17/5054 326/38 |
| 2006/0238230 A1 * | 10/2006 | Patel | G06F 1/08 327/261 |
| 2008/0034337 A1 * | 2/2008 | Kuemerle | G06F 17/5045 716/134 |
| 2009/0187368 A1 | 7/2009 | Jain | |
| 2009/0228843 A1 * | 9/2009 | Anemikos | G06F 17/5045 716/132 |
| 2011/0106497 A1 * | 5/2011 | Visweswariah | G06F 17/5045 702/182 |

* cited by examiner

*Primary Examiner* — Mohammed Alam
(74) *Attorney, Agent, or Firm* — David Cain; Hoffman Warnick LLC

(57) ABSTRACT

Various embodiments provide systems, computer program products and computer implemented methods. In some embodiments, the system includes a computer-implemented method of binning at least one integrated circuit chip, the method including determining a baseline operational voltage for the at least one integrated circuit chip, determining a total operational power threshold for the at least one integrated circuit chip, determining an initial performance characteristic for a first component of the at least one integrated circuit chip, operating the first component at a driving voltage higher than the baseline voltage to raise the initial performance characteristic of the first component to a raised performance characteristic while ensuring that operational power does not exceed the operational power threshold and assigning the at least one integrated circuit chip to a performance bin based on the raised performance characteristic.

18 Claims, 7 Drawing Sheets

REVERSE PERFORMANCE BINNING

FIELD

The subject matter disclosed herein relates generally to selective voltage binning. More particularly, the subject matter disclosed relates to selective performance binning of integrated circuit chips based on at least one raised performance parameter.

BACKGROUND

As computing systems become ever smaller and faster, power lost due to leakage current and overall power use increases. Integrated circuit designers are increasingly attempting to raise chip performance but are limited by maximum power limits imposed at the system level. In general, the fastest components of an integrated circuit chip are forced to run faster and at higher voltages in order to achieve enhanced chip performance. Such increased voltages lead to greater current leakage and therefore to greater power consumption and overall greater power loss. Leakage has become dominant in designs due to scaling that even with selective voltage binning, (SVB), the fastest processes on a chip dominate the maximum power for the chip.

BRIEF DESCRIPTION

Various embodiments provide systems, computer program products and computer implemented methods. In some embodiments, the system includes a computer-implemented method of binning at least one integrated circuit chip, the method including determining a baseline operational voltage for the at least one integrated circuit chip, determining a total operational power threshold for the at least one integrated circuit chip, determining an initial performance characteristic for a first component of the at least one integrated circuit chip, operating the first component at a driving voltage higher than the baseline voltage to raise the initial performance characteristic of the first component to a raised performance characteristic while ensuring that operational power does not exceed the operational power threshold and assigning the at least one integrated circuit chip to a performance bin based on the raised performance characteristic.

A first aspect provides a computer-implemented method of binning at least one integrated circuit chip, the method comprising: determining a baseline operational voltage for the at least one integrated circuit chip; determining a total operational power threshold for the at least one integrated circuit chip; determining an initial performance characteristic for a first component of the at least one integrated circuit chip; operating the first component at a driving voltage higher than the baseline voltage to raise the initial performance characteristic of the first component to a raised performance characteristic while ensuring that operational power does not exceed the operational power threshold; and assigning the at least one integrated circuit chip to a performance bin based on the raised performance characteristic.

A second aspect provides a system comprising: at least one computing device configured to perform binning of at least one integrated circuit chip by performing actions including: determining a baseline operational voltage for the at least one integrated circuit chip; determining a total operational power threshold for the at least one integrated circuit chip; determining an initial performance characteristic for a first component of the at least one integrated circuit chip; operating the first component at a driving voltage higher than the baseline voltage to raise the initial performance characteristic of the first component to a raised performance characteristic while ensuring that operational power does not exceed the operational power threshold; and assigning the at least one integrated circuit chip to a performance bin based on the raised performance characteristic.

A third aspect provides a computer program product comprising program code stored on a computer-readable storage medium, which when executed by at least one computing device, enables the at least one computing device to implement a method of binning at least one integrated circuit chip by performing actions including: determining a baseline operational voltage for the at least one integrated circuit chip; determining a total operational power threshold for the at least one integrated circuit chip; determining an initial performance characteristic for a first component of the at least one integrated circuit chip; operating the first component at a driving voltage higher than the baseline voltage to raise the initial performance characteristic of the first component to a raised performance characteristic while ensuring that operational power does not exceed the operational power threshold; and assigning the at least one integrated circuit chip to a performance bin based on the raised performance characteristic.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The subject matter disclosed herein relates generally to selective voltage binning. More particularly, the subject matter disclosed relates to selective performance binning of integrated circuit chips based on at least one raised performance parameter.

Figure 1:
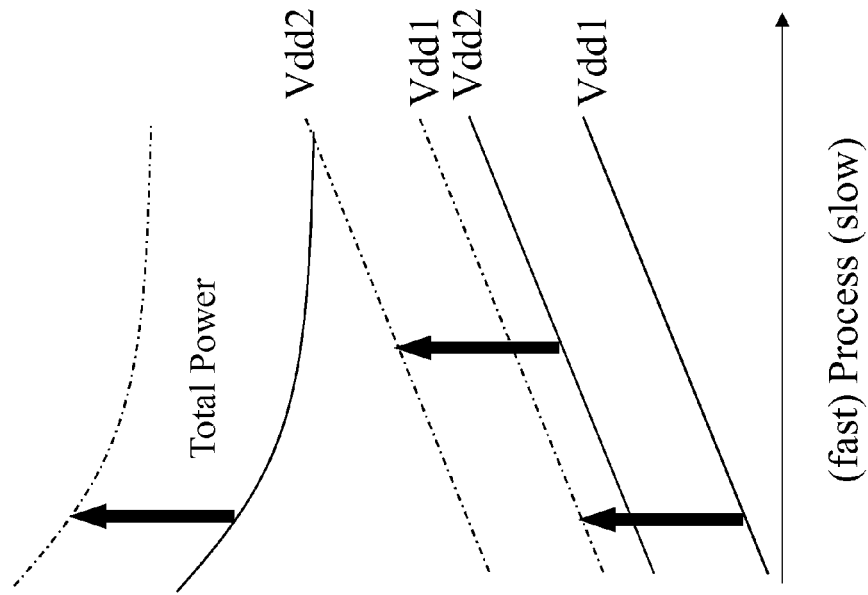
FIG. 1 shows graphs illustrating conventional performance data.

As discussed above, as computing systems become ever smaller and faster, power lost due to leakage current and overall power use increases. FIG. 1 illustrates conventional performance data. The graph illustrates performance of a chip that has components running at two different voltages, Vdd1 and Vdd2 on two different rails. Conventionally, in order to achieve enhanced performance, the fastest process components on the chip are forced to run faster and at higher voltages, resulting in higher maximum power. In FIG. 1, both voltages, Vdd1 and Vdd2, are shown as being raised across the process space in order to reduce power for chips manufactured in the fast process, and enhance the performance of the slower process integrated circuit chips. Even though voltages are significantly reduced for the fastest process integrated circuit chips, due to active and leakage power scaling in small geometry technologies the maximum power often occurs for the fastest process integrated circuit chips.

In general, the fastest processes on a chip dominate the maximum power for the chip. Even using advanced adaptive voltage scaling techniques, typical integrated circuit maximum total power is determined by the leakage at fast process corner and high temperature. Also, to optimize power consumption, many ICs have a plurality of power supply voltages to select from to ensure operability and performance for components of the design. However, as differentiated from conventional systems, various embodiments described herein enhance performance characteristics of integrated circuit (IC) chips by raising the voltage of slower/lower voltage components. Raising the performance characteristics of lower speed/lower voltage components leads to less leakage current and less power loss than conventional approaches described above. Because of the power profile of designs in small geometry technologies where leakage dominates, embodiments, described herein, build on the existing voltage/process scaling sign off methodology. Such embodiments close timing where Vdd voltage and performance are increased for a subset of the process space. By doing this, a limited number of higher performance integrated circuits may be obtained without exceeding the original "maximum power" for an integrated circuit. Embodiments described simplify system design by allowing different performance levels of the same integrated circuit within the same chassis with the same power and thermal subsystem.

Figure 2:
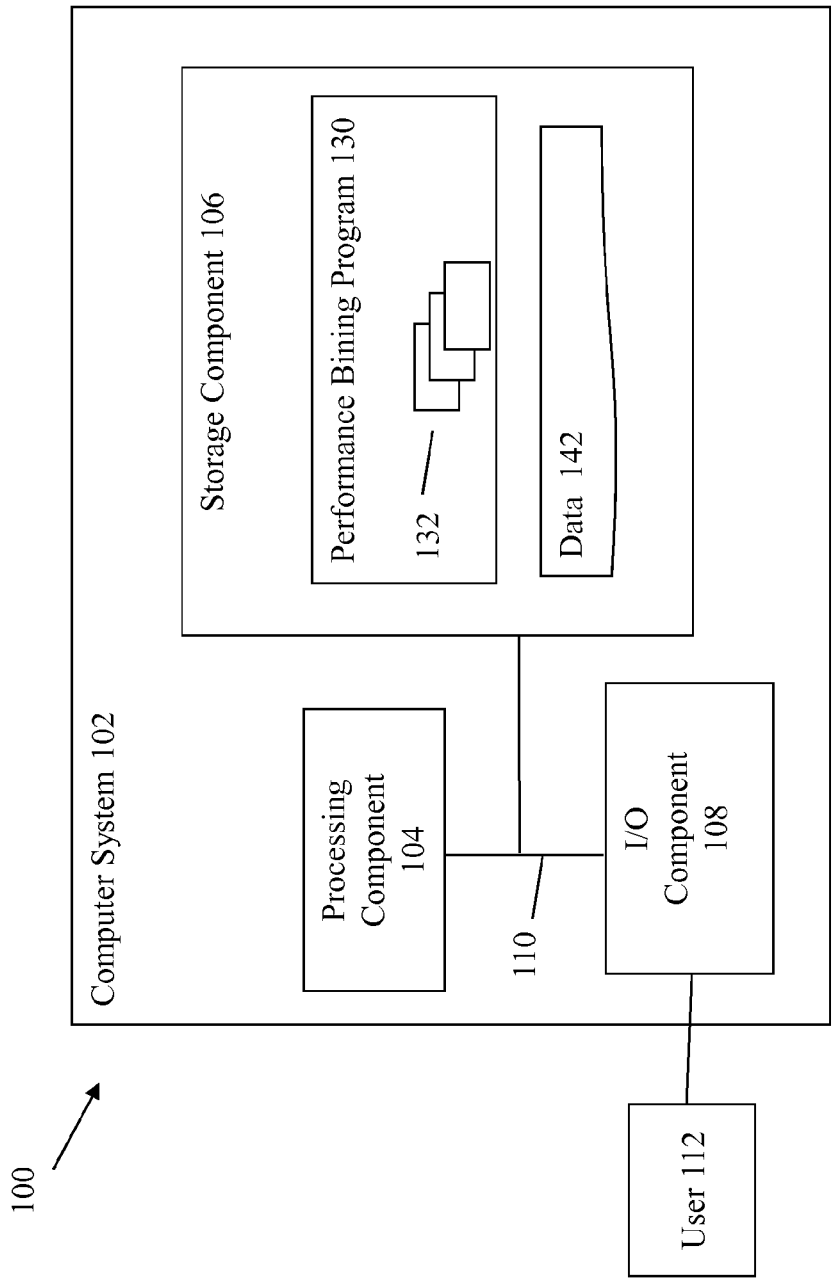
FIG. 2 shows an illustrative environment according to various embodiments.

Turning now to FIG. 2, an illustrative environment according to various embodiments is shown. FIG. 2 depicts an illustrative environment 100 for providing a computer system for reverse performance voltage binning. To this extent, the environment 100 includes a computer system 102 that can perform a process described herein in order to perform processes for reverse performance voltage binning. In particular, the computer system 102 is shown as including a performance binning program 130, which makes computer system 102 operable to handle all necessary calculations and functions by performing any/all of the processes described herein and implementing any/all of the embodiments described herein.

Computer system 102 is shown including a processing component 104 (e.g., one or more processors), a storage component 106 (e.g., a storage hierarchy), an input/output (I/O) component 108 (e.g., one or more I/O interfaces and/or devices), and a communications pathway 110. In general, the processing component 104 executes program code, such as a performance binning program 130, which may be at least partially fixed in the storage component 106. While executing program code, the processing component 104 can process data, which can result in reading and/or writing transformed data from/to the storage component 106 and/or the I/O component 108 for further processing. The pathway 110 provides a communications link between each of the components in the computer system 102. The I/O component 108 can comprise one or more human-directed, or non-human-directed I/O devices, which enable a user 112 to interact with the computer system 102 and/or one or more communications devices to enable a system user 112 to communicate with the computer system 102 using any type of communications link. User 112 may be a human, including a technician, or a non-human system. Performance binning program 130 can manage a set of interfaces (e.g., graphical user interface(s), application program interface, etc.) that enable human and/or system users 112 to interact with performance binning program 130. Further, the performance binning program 130 can manage (e.g., store, retrieve, create, manipulate, organize, present, etc.) data, such as performance data 142, etc., using any solution.

In any event, computer system 102 can comprise one or more general purpose computing articles of manufacture (e.g., computing devices) capable of executing program code, such as performance binning program 130, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, performance binning program 130 can be embodied as any combination of system software and/or application software.

Further, the performance binning program 130 can be implemented using a set of modules 132. In this case, a module 132 can enable the computer system 102 to perform a set of tasks used by the performance binning program 130, and can be separately developed and/or implemented apart from other portions of performance binning program 130. As used herein, with reference to the computer system hardware, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 106 of a computer system 102 that includes a processing component 104, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 102.

When the computer system 102 comprises multiple computing devices, each computing device may have only a portion of performance binning program 130 fixed thereon (e.g., one or more modules 132). However, it is understood that the computer system 102 and performance binning program 130 are only representative of various possible equivalent computer systems that may perform a process described herein. To this extent, in other embodiments, the functionality provided by computer system 102 and performance binning program 130 can be at least partially implemented by one or more computing devices that include any combination of general and/or specific purpose hardware with or without program code. In each embodiment, the hardware and program code, if included, can be created using standard engineering and programming techniques, respectively.

When computer system 102 includes multiple computing devices, the computing devices can communicate over any type of communications link. Further, while performing a process described herein, computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

Computer system 102 can obtain or provide data, such as data 142 using any solution. For example, computer system 102 can generate and/or be used to generate data 142, retrieve data 142, from one or more data stores, receive data 142, from another system, send data 142 to another system, etc.

Figure 3:
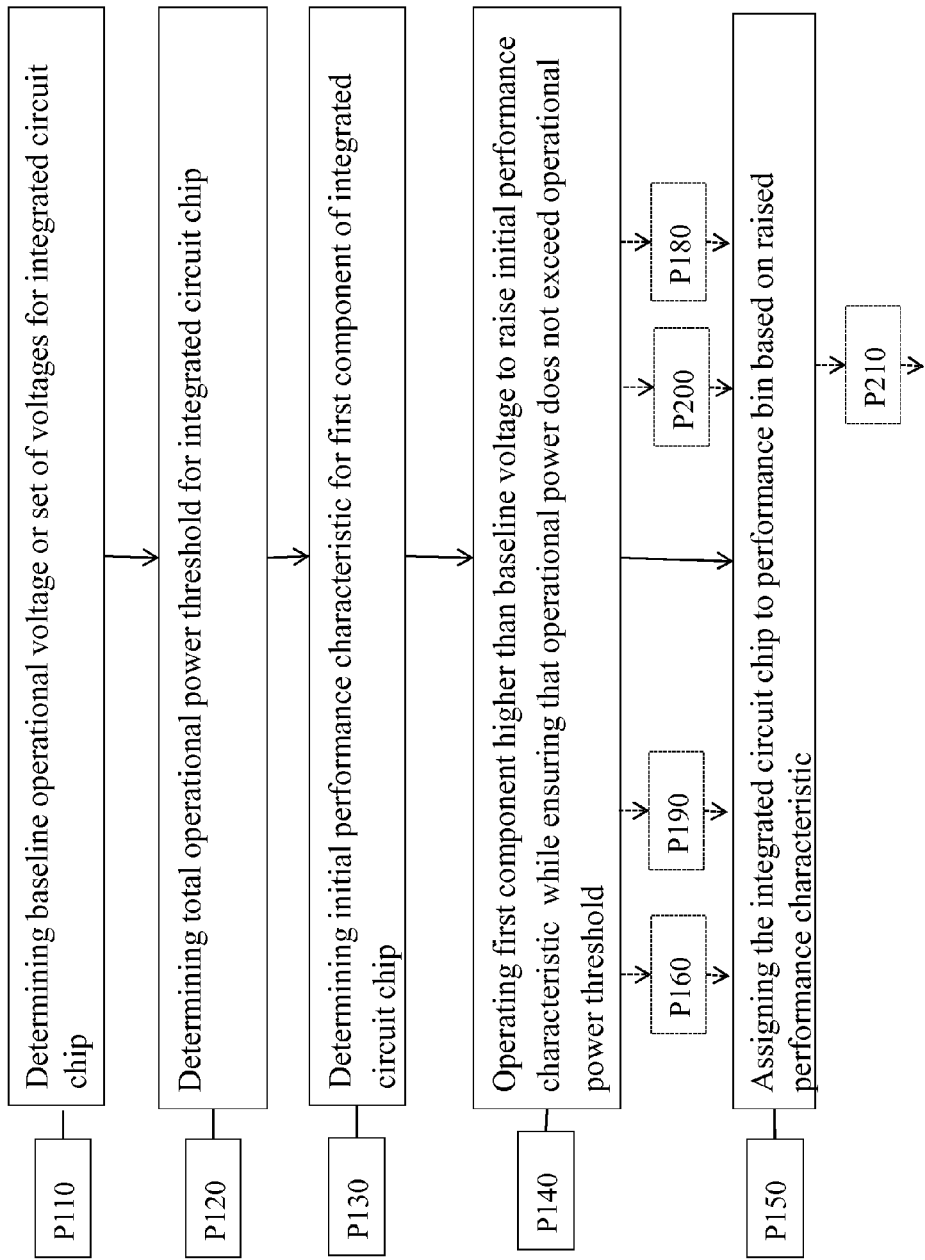
FIG. 3 shows a flow diagram illustrating a method according to various embodiments.

Referring now to FIG. 3, a flow diagram illustrating processes in a method according to various embodiments, is shown. Process P110 includes determining a baseline operational voltage for the at least one integrated circuit chip. Process P110 may optionally include determining a set of baseline voltages. According to embodiments, baseline operational voltage may be determined by simulation of circuits on the integrated circuit to reach desired performance, looking up such voltage in a table, by physical experimentation on a chip, or on a series of chips. Also, according to embodiments, determination of baseline voltage may be performed by simulation, or by any now known or later developed processes. According to embodiments, improvement of power consumption may be assisted by utilizing a plurality of power supply voltages to select from in order to ensure operability and performance of components and design. The baseline voltage, therefore, may be a voltage used to run all components on an integrated circuit (IC) chip. Also, the baseline voltage of process P100 may be a voltage that is used to drive lower-speed/lower-voltage components on a chip that includes components that are run at different (relatively higher and relatively lower) speeds and at different (relatively higher and relatively lower) voltages. According to various embodiments the first component may include at least one low voltage component driven by a first supply voltage, and the at least one integrated circuit chip may include at least one high voltage component driven by a second supply voltage the second supply voltage being greater than the first supply voltage.

Process P120 includes determining a total operational power threshold for the at least one integrated circuit chip. The operational power threshold may be a threshold that may preferably not be exceeded, or a threshold that absolutely must not be exceeded, for example to prevent damage to the IC chip, or due to constraints in system electrical or cooling specifications. The operational power threshold may further be a point at which diminished returns are gained by increasing power in the IC chip. According to embodiments, operational power threshold may be determined by looking up such data in a table, by physical experimentation on a chip, or on a series of chips. Also, according to embodiments, determination of operational power threshold may be performed by simulation, or by any now known or later developed processes.

Process P130 includes determining an initial performance characteristic for a first component of the at least one integrated circuit chip. The initial performance characteristic may be an operating frequency of the first component. Operating frequencies may be in the megahertz range or they may be orders of magnitude above or below the megahertz range, however it should be understood that these ranges are not intended to be limiting of the scope of the embodiments described. Other initial performance characteristics may include leakage current, power dissipated due to leakage current, or other operating parameters known in the art. According to embodiments, an initial performance characteristic may be determined by looking up such an initial performance characteristic in a table, by physical experimentation on a chip, or on a series of chips. Also, according to embodiments, determination of an initial performance characteristic may be performed by simulation, or by any now known or later developed processes.

Process P140 includes operating the first component at a voltage higher than the baseline voltage to raise the initial performance characteristic of the first component to a raised performance characteristic while ensuring that operational power does not exceed the operational power threshold. Other components, in addition to the first component, may be driven at the voltage higher than the baseline voltage. Also, the first component may be driven at one of a plurality of voltages higher than the baseline voltage. It is further within the scope of the embodiments that components may be driven at voltages lower than the baseline voltage.

Process P150 includes assigning the at least one integrated circuit chip to a performance bin based on the raised performance characteristic. According to embodiments, IC chips are assigned to bins based on their performance, and raising a performance characteristic of a chip may give rise to assigning the chip to a different bin. For a non-limiting example, a chip may be assigned to an "X" megahertz bin, but after at least one, or some of its components are driven at a higher-than-baseline voltage and therefore are run at a faster frequency, the chip may be assigned to a "Y" megahertz bin, where Y is a value greater than X.

FIG. 3 introduces optional processes P106-P200, shown in dotted-lined boxes. Optional processes P160-P200 are illustrated in FIGS. 4-7 and are described below.

Figure 4:
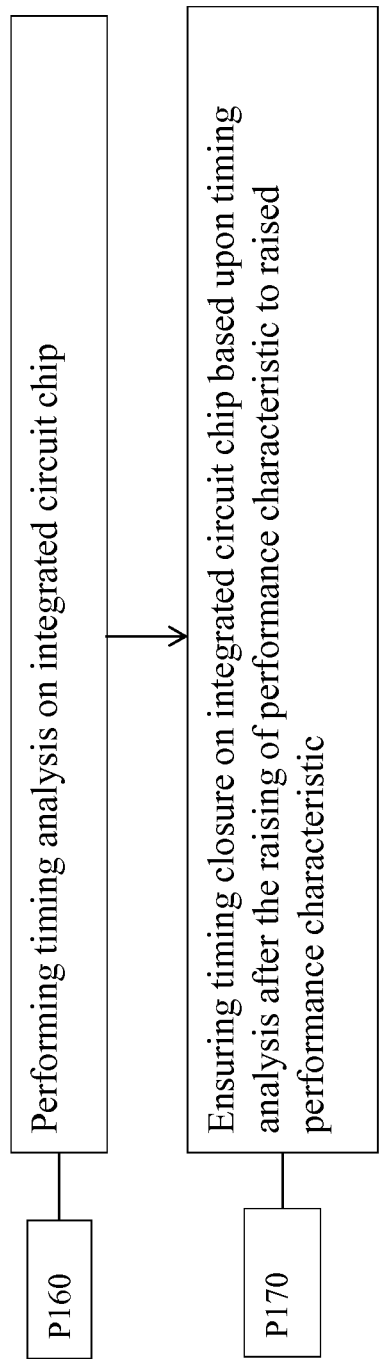
FIG. 4 shows flow diagram components illustrating optional processes that may be performed in conjunction with methods according to various embodiments.

FIG. 4 shows flow diagram components illustrating optional processes that may be performed in conjunction with methods according to various embodiments. FIG. 4 illustrates process P160, which includes performing a timing analysis on the integrated circuit chip. According to embodiments, the timing analysis may be performed using performance characteristics which are correlated to a ring oscillator or any other appropriate equipment now known or later developed. According to embodiments, voltage, process targets and/or performance characteristic targets, including frequency targets may be adjusted in order to attain greater performance or more desirable performance. Optional process P160 is followed by optional process P170, which includes ensuring timing closure on the integrated circuit chip based upon the timing analysis after the raising of the performance characteristic of the first component to the raised performance characteristic. By ensuring timing closure, it is meant that the chip meets timing requirements. According to embodiments, meeting timing requirements may mean that a FPGA or a VLSI design performs within timing design specifications. Ensuring timing closure may be performed using electronic design automation (EDA) tools now known or later developed. Methods of ensuring timing closure include but are not limited to performing timing analysis based upon delays at operating conditions outlined by the operating points of both the default operating conditions and the conditions in which a set of chips will operate at a limited process and alternate voltage range. In addition, other methods of timing closure could be performed where timing closure over the entire operating range, including the elevated frequency and alternate voltage, is performed by computing delay as a parameter (statistical or deterministic) of both the standard and alternate voltages, temperatures and process ranges along with other parameters effecting delay of circuits. Ensuring timing closure may be performed as a safeguard, to ensure that the IC chip is assigned to a correct bin. For example, to ensure that the IC chip may operate properly at Y megahertz after being assigned to a Y megahertz bin.

Figure 5:
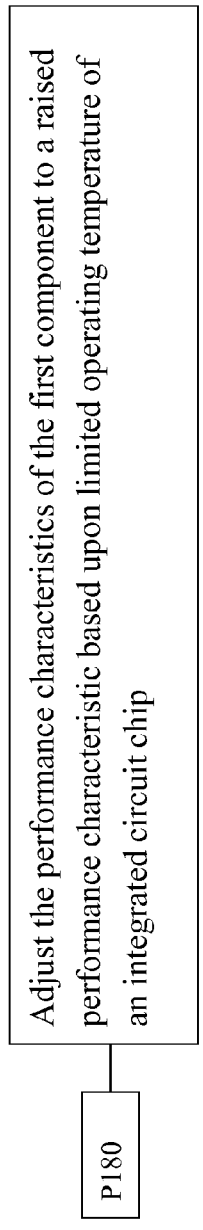
FIG. 5 shows flow diagram components illustrating optional processes that may be performed in conjunction with methods according to various embodiments.

FIG. 5 illustrates optional process P180 which includes adjusting an operating temperature limit of the integrated circuit chip to alter, (i.e. to raise or lower) the initial performance characteristic of the first component to a raised or lowered performance characteristic. Process P180 may be performed prior to process P150 and prior to optional processes P160 and P170. According to embodiments, the raised temperature may be monitored to ensure desired operation of the IC chip. The operating voltage and performance characteristic can be modified for any IC chip based upon temperature characteristics at any time during the operation of the IC chip as shown in process P210. Due to the increase of leakage power at increased temperature just as leakage power increases at faster process, a temperature based method that behaves similarly to the process based method can be practiced, where devices operating at low temperatures could achieve higher performance at elevated voltages without exceeding maximum power limits.

Figure 6:
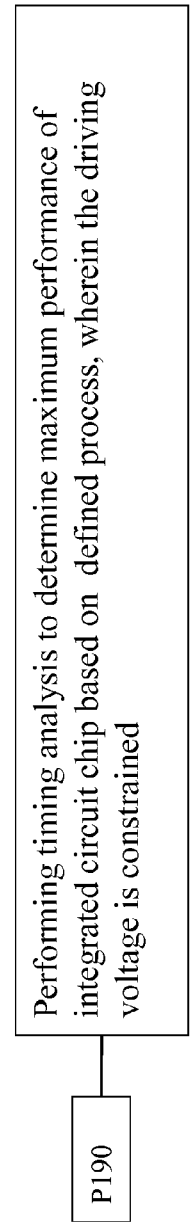
FIG. 6 shows flow diagram components illustrating optional processes that may be performed in conjunction with methods according to various embodiments.

FIG. 6 shows flow diagram components illustrating optional processes that may be performed in conjunction with methods according to various embodiments. FIG. 5 illustrates process P190, which includes performing a timing analysis to determine a maximum performance of the integrated circuit chip based on a defined process, wherein the operating voltage is constrained. By constrained it should be understood that the operating voltage is limited, either by design or by physical attributes of materials of the chip or by system constraints including limitation of power supply options, thermal or electrical considerations. According to embodiments, the timing analysis may be performed using the same methodology and/or equipment as the timing analysis performed in process P160. Alternatively, the timing analysis of process P180 may be performed using different methodology and/or equipment. The defined process may include manufacturing process based methods for determining delay versus manufacturing process and temperature based methods of determining delay versus temperature, along with models for other components of variability and delay sensitivity within an integrated circuit.

Figure 7:
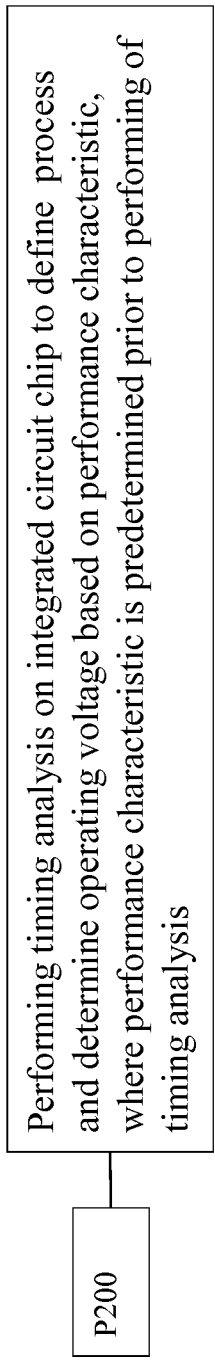
FIG. 7 shows flow diagram components illustrating optional processes that may be performed in conjunction with methods according to various embodiments.

FIG. 7 illustrates optional process P200, which includes performing a timing analysis on the integrated circuit chip to define a process and to determine the operating voltage based on the performance characteristic, wherein the performance characteristic is predetermined prior to the performing of the timing analysis. Process P200 may be performed prior to P150. The defined process may include any or all of those discussed above with respect to process P190.

Figure 8:
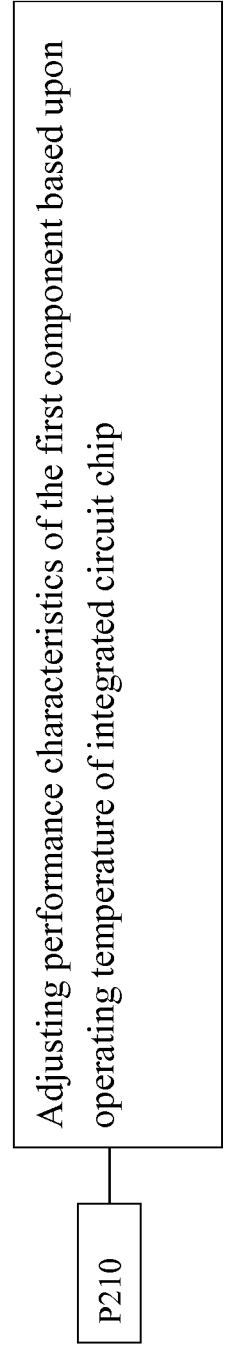
FIG. 8 shows flow diagram components illustrating optional processes that may be performed in conjunction with methods according to various embodiments.

FIG. 8 shows flow diagram components illustrating optional processes that may be performed in conjunction with methods according to various embodiments. FIG. 8 shows optional process P210 which includes adjusting the performance characteristics of the first component performance characteristic based upon operating temperature of integrated circuit chip. Process P210 may be performed after process P150.

Figure 9:
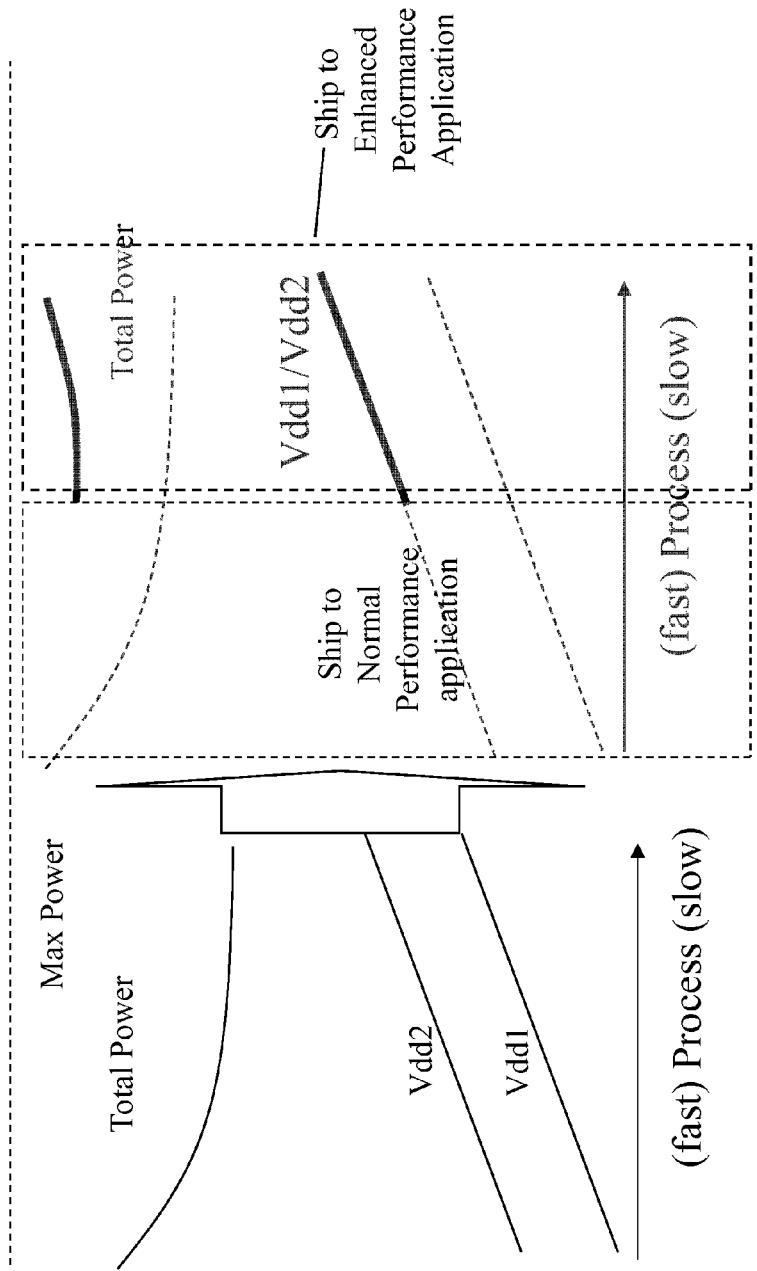
FIG. 9 shows graphs illustrating performance data according to exemplary embodiments.

FIG. 9 shows graphs illustrating data according to exemplary embodiments. The graph on the left side of FIG. 9 illustrates that as process speed increases total power increases, and total power may approach a maximum power. The voltage slopes represent a system which uses two voltage supplies to optimize power, and implements Selective Voltage Binning where the slow process bins are operated at an elevated voltage compared to the fast process bins. Because fast process leakage power growth due to process at low voltage exceeds active power growth due to increased voltage at slow process, the maximum power for an integrated circuit chip is often shown at the fastest process.

The graph on the right of FIG. 6 is separated by two dashed boxes. The dashed box on the left, labeled "ship to normal performance application" illustrates the same performance characteristics described in regard to the graph on the right side of FIG. 9. The dashed box on the right side, labeled "ship to enhanced performance application" illustrates performance of a chip after a relatively low driving voltage is raised and therefore after a performance characteristic is improved. The portion of the graph labeled "ship to enhanced performance application" illustrates Vdd1 being raised to equal Vdd2. In general, Vdd1 is a relatively low voltage used to drive IC chip components and Vdd2 is a voltage higher than Vdd1. According to embodiments, Vdd1 is raised to Vdd2 in order to enhance a performance characteristic of an IC chip component and thereby enhance a performance characteristic of the IC chip. This portion of FIG. 6 illustrates that total power increases as Vdd2 is used to drive components, however total power does not exceed a maximum power threshold. In this example the same voltage for Vdd1 and Vdd2 is used assuming Vdd2 does not determine the maximum performance of the integrated circuits. If Vdd2 is a factor in determining maximum performance for the integrated solution, both voltages could be raised to achieve desired performance. Two voltages are used to show a simplified case, an unlimited number of voltage supplies can be used.

While shown and described herein as a method and system for enhanced performance binning, it is understood that aspects of the invention further provide various alternative embodiments. For example, in one embodiment, the invention provides a computer program fixed in at least one computer-readable medium, which when executed, enables a computer system to perform a method of binning integrated circuit chips by performance. To this extent, the computer-readable medium includes program code, such as computer system 102 (FIG. 2), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of selective performance binning. In this case, a computer system, such as computer system 102 (FIG. 2), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a business method that performs a process described herein on a subscription, advertising, and/or fee basis. That is, a service provider could offer to characterize an optical mask as described herein. In this case, the service provider can manage (e.g., create, maintain, support, etc.) a computer system, such as computer system 102 (FIG. 2), that performs a process described herein for one or more customers. In return, the service provider can receive payment from the customer(s) under a subscription and/or fee agreement, receive payment from the sale of advertising to one or more third parties, and/or the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method of binning at least one integrated circuit chip, the method comprising:
   determining a baseline operational voltage for the at least one integrated circuit chip;
   determining a total operational power threshold for the at least one integrated circuit chip;
   determining an initial performance characteristic for a first component of the at least one integrated circuit chip;
   operating the first component at a driving voltage higher than the baseline voltage to raise the initial performance characteristic of the first component to a raised performance characteristic while ensuring that operational power does not exceed the operational power threshold; and
   assigning the at least one integrated circuit chip to a performance bin based on the raised performance characteristic.

2. The method of claim 1, wherein the first component includes at least one low voltage component driven by a first supply voltage, and wherein the at least one integrated circuit chip includes at least one high voltage component driven by a second supply voltage, the second supply voltage being greater than the first supply voltage.

3. The method of claim 1, further comprising:
   performing a timing analysis on the integrated circuit chip; and
   ensuring timing closure on the integrated circuit chip based upon the timing analysis after the raising of the performance characteristic of the first component to the raised performance characteristic.

4. The method of claim 1, further comprising:
   adjusting an operating temperature limit of the integrated circuit chip to alter the initial performance characteristic of the first component to a raised performance characteristic.

5. The method of claim 1, further comprising:
   performing a timing analysis to determine a maximum performance of the integrated circuit chip based on a defined process, wherein the driving voltage is constrained.

6. The method of claim 1, further comprising:
   performing a timing analysis on the integrated circuit chip to define a process and to determine the driving voltage based on the performance characteristic, wherein the performance characteristic is predetermined prior to the performing of the timing analysis.

7. A system comprising:
   at least one computing device configured to perform binning of at least one integrated circuit chip by performing actions including:
   determining a baseline operational voltage for the at least one integrated circuit chip;
   determining a total operational power threshold for the at least one integrated circuit chip;
   determining an initial performance characteristic for a first component of the at least one integrated circuit chip;
   operating the first component at a driving voltage higher than the baseline voltage to raise the initial performance characteristic of the first component to a raised performance characteristic while ensuring that operational power does not exceed the operational power threshold; and
   assigning the at least one integrated circuit chip to a performance bin based on the raised performance characteristic.

8. The system of claim 7, wherein the first component includes at least one low voltage component driven by a first supply voltage, and wherein the at least one integrated circuit chip includes at least one high voltage component driven by a second supply voltage, the second supply voltage being greater than the first supply voltage.

9. The system of claim 7, further comprising:
   performing a timing analysis on the integrated circuit chip; and
   ensuring timing closure on the integrated circuit chip based upon the timing analysis after the raising of the performance characteristic of the first component to the raised performance characteristic.

10. The system of claim 7, further comprising:
adjusting an operating temperature limit of the integrated circuit chip to alter the initial performance characteristic of the first component to a raised performance characteristic.

11. The system of claim 7, further comprising:
performing a timing analysis to determine a maximum performance of the integrated circuit chip based on a defined process, wherein the driving voltage is constrained.

12. The system of claim 7, further comprising:
performing a timing analysis on the integrated circuit chip to define a process and to determine the driving voltage based on the performance characteristic, wherein the performance characteristic is predetermined prior to the performing of the timing analysis.

13. A computer program product comprising program code stored on a computer-readable storage medium, which when executed by at least one computing device, enables the at least one computing device to implement a method of binning at least one integrated circuit chip by performing actions including:
determining a baseline operational voltage for the at least one integrated circuit chip;
determining a total operational power threshold for the at least one integrated circuit chip;
determining an initial performance characteristic for a first component of the at least one integrated circuit chip;
operating the first component at a driving voltage higher than the baseline voltage to raise the initial performance characteristic of the first component to a raised performance characteristic while ensuring that operational power does not exceed the operational power threshold; and
assigning the at least one integrated circuit chip to a performance bin based on the raised performance characteristic.

14. The computer program product of claim 13, wherein the first component includes at least one low voltage component driven by a first supply voltage, and wherein the at least one integrated circuit chip includes at least one high voltage component driven by a second supply voltage, the second supply voltage being greater than the first supply voltage.

15. The computer program product of claim 13, further comprising:
performing a timing analysis on the integrated circuit chip; and
ensuring timing closure on the integrated circuit chip based upon the timing analysis after the raising of the performance characteristic of the first component to the raised performance characteristic.

16. The computer program product of claim 13, further comprising:
adjusting an operating temperature limit of the integrated circuit chip to alter the initial performance characteristic of the first component to a raised performance characteristic.

17. The computer program product of claim 13, further comprising:
performing a timing analysis to determine a maximum performance of the integrated circuit chip based on a defined process, wherein the driving voltage is constrained.

18. The computer program product of claim 13, further comprising:
performing a timing analysis on the integrated circuit chip to define a process and to determine the driving voltage based on the performance characteristic, wherein the performance characteristic is predetermined prior to the performing of the timing analysis.

* * * * *